Dec. 6, 1966  A. MEIER-SCHENK  3,289,937
DEVICE FOR AUTOMATICALLY REGULATING THE FLOW OF THE
HEAT CARRIER IN A HEATING INSTALLATION
Filed Aug. 18, 1964
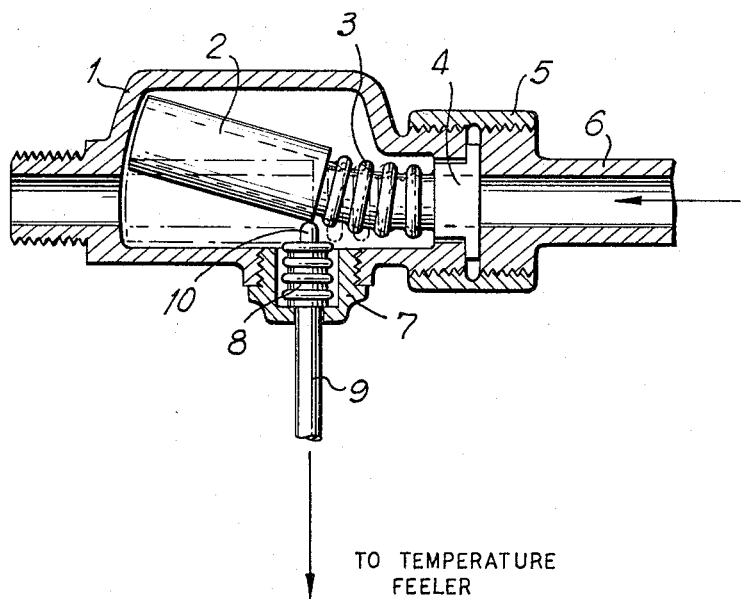
TO TEMPERATURE
FEELER
*INVENTOR.*
ARTHUR MEIER-SCHENK
BY
ATTORNEYS United States Patent Office 3,289,937
Patented Dec. 6, 1966

3,289,937
DEVICE FOR AUTOMATICALLY REGULATING THE FLOW OF THE HEAT CARRIER IN A HEATING INSTALLATION
Arthur Meier-Schenk, Oleanderstrasse 8, Zurich, Switzerland
Filed Aug. 18, 1964, Ser. No. 390,347
Claims priority, application Switzerland, Aug. 22, 1963, 10,393/63
5 Claims. (Cl. 236—99)

The present invention relates to a device for the automatic regulation of the flow of the heat carrier in a heating installation by means of a temperature feeler exposed to the temperature to be regulated.

Known regulating devices of this type comprise for example a blade wheel placed into the heat carrier conduit in such manner that it is rotated by the heat carrier flow whereby this rotation is directly or indirectly stopped or braked so as to throttle down the heat carrier flow in response to a signal of a temperature feeler indicating that the upper temperature limit is reached.

These known regulating devices have the drawback that their blade wheel as a movable part is subjected to wear and thus not reliable in operation.

The prime object of the present invention is to realize a device for automatically regulating the flow of a heat carrier in a conduit in response to temperature, that is free from perturbations due to movable parts and that additionally affords for a rapid and safe regulation of the controlled temperature by regulating the flow of the heat carrier.

To this end according to the present invention a device of the afore-mentioned type is characterized by the fact that a resiliently flexible pipe portion is connected into the heat carrier conduit, which pipe portion is arranged to deflect in one direction and thereby to throttle the flow of the heat carrier at high temperature and to deflect in another direction and thereby liberate the flow of the heat carrier at low temperature, whereby the degree of said deflections is directly or indirectly controlled by the temperature feeler.

Since the device according to the invention does not present any regulating valve with small passage slot inevitable in such valves the flow quantity of the heat carrier in the conduit is not at all influenced when the device of the invention is fully open. As a further advantage it may be stated that the device of the invention responds very quickly so that the desired temperature is maintained within very narrow limits.

Preferably the temperature feeler comprises a cylinder filled with an expanding liquid, a piston slidable in this cylinder for adjustment of the temperature limits and an expandable element deflecting by its movements through a pin the resiliently flexible pipe portion.

Other features and advantages of the invention will become apparent from the description now to follow, of a preferred embodiment thereof, given by way of example only, and in which reference will be made to the accompanying drawing.

The unique figure thereof shows a longitudinal axial section through a device according to the invention provided with a pin arranged perpendicular to the heat carrier conduit and influenced by the temperature feeler. The full lines show the strongly deflected position of the resiliently flexible pipe portion in which the heat carrier flow through the conduit is throttled down to a minimum. The interrupted lines in contradistinction thereto show the position of the resiliently flexible pipe in non-deflected position, in which the heat carrier may freely flow through the device.

The device represented in the drawing comprises a housing 1 adapted to be connected into a heat carrier conduit of a central heating installation. The connection may be effected by means of a threaded sleeve 5 threaded both to the housing 1 and to the ends of the conduit as shown for example for the conduit 6. The direction of flow of the heat carrier in the conduit and through the device is indicated by an arrow in conduit 6.

Between the end of conduit 6 and the inlet opening of the housing 1 there is clamped by means of the sleeve 5 a flange 4 to which is secured a resiliently flexible pipe portion 3. A further pipe portion 2 that need not be flexible is in turn connected with the pipe portion 3. The latter is formed of a bellows. The unit formed by the portions 3 and 2 in the housing 1 may be deflected by a temperature sensing means including a pin 10 laterally engaging the unit between the portions 2 and 3 which is movable such as by a bellows 8 in accordance with temperature sensed by a temperature feeler which comprises control fluid in a connecting conduit or feeler 9. This pin 10 is connected with its end opposite the end engaging the unit 2, 3 with a further bellows 8 which in turn is connected with a conduit 9 leading to the temperature feeler (not shown). A cap nut 7 secures the parts 8, 9 and 10 in position to the housing 1.

Subsequent to the gauging of the temperature feeler, which may be arranged in a room and provided with a scale on its housing it is adjusted to the temperature which it is desired to maintain in this room heated by the heating installation into which the regulating device of the invention is connected. As the room temperature exceeds the one to which the temperature feeler is adjusted the expanding fluid in conduit 9 dilates the bellows 8 which expands radially into the housing 1 thereby entraining the pin 10 that is thus pressed in upward direction as seen in the drawing and deflects to an amount depending on the dilation of the bellows 8 the tube portion 2. This results in a corresponding throttling of the flow of heat carrier through the heating installation conduits in which the regulating device is connected and consequently in a reduced heating of the room so that the temperature of the latter drops. As the temperature in the room tends to fall below the adjusted point the expanding fluid in conduit 9 and bellows 8 contracts, whereby the pin 10 withdraws. Under the action of its proper elasticity the unit 2, 3 may now take the straight position in interrupted lines in the drawing and permit unhindered passage of the heat carrier through the device. The obvious result thereof is an increase of the heating of the room containing the temperature feeler. The latter may be connected with the housing 1 through a conduit 9 of any desired length.

The simplicity of the described device permits unlimited possibilities of combinations of the arrangement of the supply and of the discharge conduit as far as the geometrical position thereof is concerned. Wide possibilities are also given for the placing of the connection of the conduit from the temperature feeler to the housing or for directly incorporating the temperature feeler into this housing since the position of the resiliently flexible pipe portion need not necessarily be horizontal as shown in the drawing.

I claim:
1. A fluid control device comprising a housing having a fluid discharge opening and a blocking wall inside said housing aligned alongside the opening, an inlet conduit extending into said housing having a displaceable end portion terminating in a fluid flow opening which may be selectively aligned with said fluid discharge opening for full fluid flow through said conduit and through said discharge opening and aligned with at least a portion of said blocking wall to cause restriction of the fluid flow opening for reduced fluid flow, and temperature sensing means mounted on said housing including a movable member adjacent said displaceable end portion of said inlet con- duit and movable upon changes in temperature to displace said end portion relative to said fluid discharge opening and said blocking wall for regulating the amount of fluid flow through said discharge opening.

2. A fluid control device comprising a housing having a fluid discharge opening and a blocking wall inside said housing aligned alongside the opening, an inlet conduit extending into said housing having a displaceable end terminating in a fluid flow opening which may be selectively aligned with said fluid discharge opening for full fluid flow through said conduit and through said discharge opening and aligned with at least a portion of said blocking wall to cause restriction of the fluid flow opening for reduced fluid flow, and temperature sensing means mounted on said housing including a movable member adjacent said displaceable end portion of said inlet conduit and movable upon changes in temperature to displace said end portion relative to said fluid discharge opening and said blocking wall for regulating the amount of fluid flow, said inlet conduit having a portion adjacent the end within said housing made of a flexible material to permit bending thereof.

3. A fluid control device comprising a housing having a fluid discharge opening and a blocking wall inside said housing aligned alongside the opening, an inlet conduit extending into said housing having a displaceable end portion terminating in a fluid flow opening which may be selectively aligned with said fluid discharge opening for full fluid flow through said conduit through said discharge opening and aligned with at least a portion of said blocking wall for reduced fluid flow, and temperature sensing means mounted on said housing including a movable member adjacent said displaceable end portion of said inlet conduit and movable upon changes in temperature to displace said end portion relative to said fluid discharge opening and said blocking wall for regulating the amount of fluid flow, said conduit including a first conduit portion terminating in a flange and a second end conduit portion having a flange aligned with the flange of the first conduit portion, and a nut member threadably engaged with said first conduit portion and said housing for holding said end conduit portion between said first conduit portion and said housing.

4. A fluid control device comprising a housing having a fluid discharge opening and a blocking wall inside said housing aligned alongside the opening, an inlet conduit extending into said housing having a displaceable end portion terminating in a fluid flow opening which may be selectively aligned with said fluid discharge opening for full fluid flow through said conduit through said discharge opening and aligned with at least a portion of said blocking wall for reduced fluid flow, and temperature sensing means mounted on said housing including a movable member adjacent said displaceable end portion of said inlet conduit and movable upon changes in temperature to displace said end portion relative to said fluid discharge opening and said blocking wall for regulating the amount of fluid flow, said conduit including a first conduit portion terminating in a flange and a second end conduit portion having a flange aligned with the flange of the first conduit portion, a nut member threadably engaged with said first conduit portion and said housing for holding said end conduit portion between said first conduit portion and said housing, said second end conduit portion including an outer substantially rigid portion and an intermediate bellows portion of flexible material which is displaceable, said temperature sensing means including a temperature feeler terminating in a bellows end portion with a pin at the end of said bellows end portion which is engageable in the intermediate bellows portion of said conduit end portion.

5. A fluid control device comprising a housing having a fluid discharge opening adjacent one end with an interior wall extending away from said opening and forming a fluid blocking surface, an inlet conduit for the flow of fluid to said housing including a flanged end portion, an end portion fitting for said inlet conduit including a flange portion held between the flange portion of said first conduit portion and said housing, a flexible inlet conduit bellows portion, and an inlet conduit end portion terminating with a fluid inlet opening which may be alignable with the discharge opening of said housing and with at least a portion of said wall respectively, a control element mounted on said housing including a temperature feeler member having a control bellows portion which is movable and carries a pin at its end which is engageable with said inlet conduit bellows portion being displaceable in accordance with the variation of the position of said pin with said control bellows portion for shifting said inlet conduit end portion for varying the location of the opening at the end thereof in said housing in respect to the discharge opening and said blocking wall.

References Cited by the Examiner
UNITED STATES PATENTS

| | | | |
|---|---|---|---|
| 1,176,727 | 3/1916 | Clorius | 236—99 |
| 2,128,682 | 8/1938 | Manteuffel | 137—83 |
| 2,255,292 | 9/1941 | Lincoln | 236—99 X |
| 3,004,547 | 10/1961 | Hurvitz | 137—83 |
| 3,137,309 | 6/1964 | Blase et al. | 137—83 |

ALDEN D. STEWART, *Primary Examiner.*